United States Patent [19]

Shenefiel et al.

[11] Patent Number: 5,205,961
[45] Date of Patent: Apr. 27, 1993

[54] GRANULAR CALCIUM HYPOCHLORITE TREATMENT PROCESS

[75] Inventors: Donald E. Shenefiel; Richard H. Ferguson, both of Wetzel, W. Va.

[73] Assignee: PPG Industries, Inc., Pittsburgh, Pa.

[21] Appl. No.: 687,142

[22] Filed: Apr. 18, 1991

[51] Int. Cl.$^5$ ............................................. C01B 11/06
[52] U.S. Cl. ........................... 252/186.37; 252/186.36; 252/187.27; 252/187.28
[58] Field of Search ................... 252/186.37, 186.36, 252/187.28, 187.27

[56] References Cited

U.S. PATENT DOCUMENTS

| | | | |
|---|---|---|---|
| 3,173,817 | 3/1965 | Wright | 149/2 |
| 3,326,731 | 6/1967 | Noddin | 149/19 |
| 3,455,749 | 7/1969 | Gow | 149/4 |
| 3,466,204 | 9/1969 | Gow | 149/3 |
| 3,838,092 | 9/1974 | Vogt et al. | 260/33.6 F |
| 3,993,584 | 11/1976 | Owens et al. | 252/383 |
| 4,087,360 | 5/1978 | Faust et al. | 210/58 |
| 4,136,052 | 1/1979 | Mazzola | 252/94 |
| 4,253,950 | 3/1981 | Wojtowicz | 210/696 |
| 4,390,512 | 6/1983 | Loehr et al. | 423/474 |
| 4,552,679 | 11/1985 | Schobel et al. | 252/90 |
| 4,756,844 | 7/1988 | Walles et al. | 252/95 |
| 4,865,760 | 9/1989 | Johnson et al. | 252/187.28 |
| 4,961,872 | 10/1990 | Sinclair | 252/186.37 |
| 4,970,020 | 11/1990 | Johnson et al. | 252/187.28 |
| 5,009,806 | 4/1991 | Johnson et al. | 252/187.28 |

FOREIGN PATENT DOCUMENTS 891537 3/1962 United Kingdom .
930093 7/1963 United Kingdom .

*Primary Examiner*—Richard D. Lovering
*Assistant Examiner*—Joseph D. Anthony
*Attorney, Agent, or Firm*—Irwin M. Stein

[57] ABSTRACT

A method for preparing granular calcium hypochlorite treated with polyfluorinated polymer is disclosed. The treated product may be compressed and formed into shaped articles. A method described comprises spraying a suspension of polyfluorinated polymer, e.g., polytetrafluoroethylene, onto granular calcium hypochlorite in a continuous or batch blender. Tablets prepared from the granular hypochlorite so surface treated with polyfluorinated polymer dissolve in water at a rate slower than tablets prepared from granular calcium hypochlorite having polyfluorinated polymer dispersed throughout the granules. Granular calcium hypochlorite having a particle size range of −6, +100 U.S. Sieve Series having from about 0.005 to 0.5 weight percent polyfluorinated polymer on its surface are described.

15 Claims, 1 Drawing Sheet

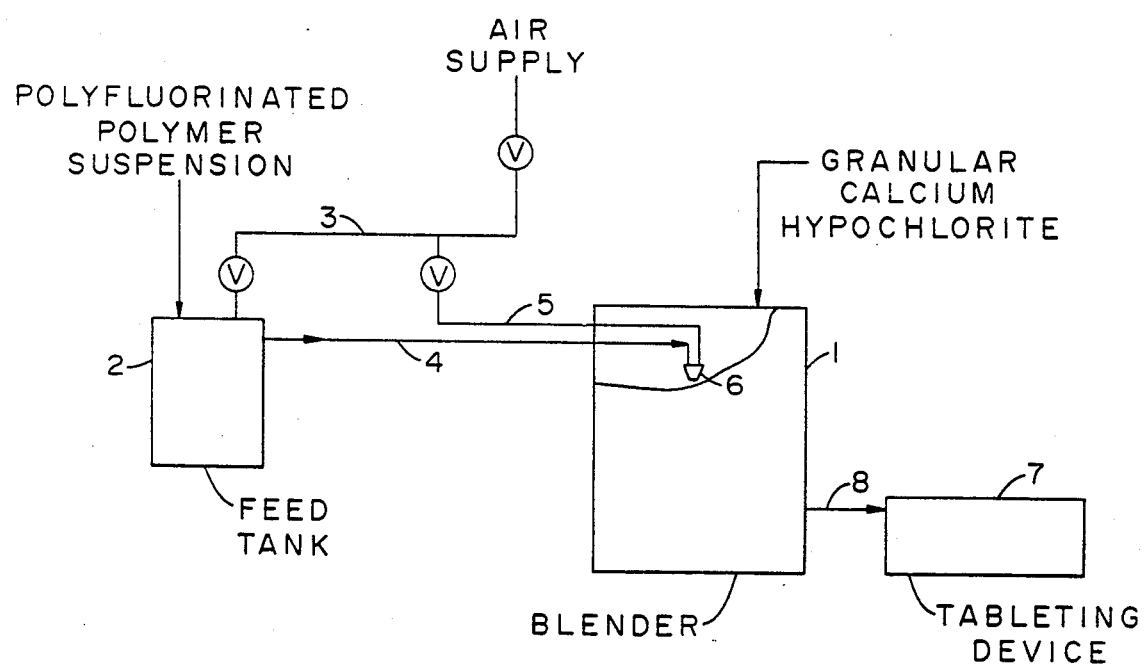

GRANULAR CALCIUM HYPOCHLORITE TREATMENT PROCESS

DESCRIPTION OF THE INVENTION

The present invention relates to a new process for producing granular calcium hypochlorite suitable for compaction into slow dissolving shaped solid articles of manufacture. More particularly, this invention relates to granular calcium hypochlorite in which the surface of the granules has been treated with polyfluorinated polymer, and to solid articles, such as tablets, prepared from such treated granular calcium hypochlorite.

Calcium hypochlorite enjoys a major portion of the market for available chlorine compounds because it is the cheapest and most stable solid chlorine compound known which delivers all of its available chlorine immediately on contact with oxidizable materials. Calcium hypochlorite compositions containing at least 65 weight percent of available chlorine have been on the market for many years and are used primarily as a commercial bleaching and sanitizing agent, particularly in the disinfection and sanitizing of water supplies such as swimming pool water. Solid formed articles of calcium hypochlorite, e.g., tablets, can provide a more continuous source of available chlorine for disinfecting and sanitizing water over a longer period of time than granular calcium hypochlorite.

For the treatment of residential swimming pool water, it is conventional to broadcast periodically granular calcium hypochlorite directly on the water in the pool in quantities sufficient to maintain the amount of available chlorine in such water at or above the desired levels, e.g., from less than 1 part per million to a few parts per million of available chlorine. In an alternative method, tablets of calcium hypochlorite are placed in a skimmer or in dissolving baskets located around the swimming pool to provide continuous contact between circulating pool water and the tablets of calcium hypochlorite. A further method used to treat swimming pool water is to add granular or tableted calcium hypochlorite to a dispensing device in which the calcium hypochlorite is contacted with water to dissolve the calcium hypochlorite and form a concentrated calcium hypochlorite aqueous solution having a higher concentration of available chlorine than required in the pool water. This concentrated solution is then added to the total body of pool water to provide available chlorine in the pool at the desired level.

When added to water at room temperature, granular calcium hypochlorite dissolves rapidly. Consequently, treatment of water, e.g., swimming pool water, is required almost daily to maintain a disinfecting or sanitizing quantity of available chlorine in the swimming pool. A source of calcium hypochlorite, which provides a relatively constant source of available chlorine over an extended period, e.g., 4–6 or 7 days, is a highly desirable feature for the consumer and ultimate user of calcium hypochlorite.

U.S. Pat. No. 4,865,760 describes mixing finely-divided polyfluorinated polymer with finely-divided calcium hypochlorite, compacting the resulting blend and subsequently granulating the compacted material, thereby to produce granular calcium hypochlorite containing finely-divided unfibrillated polyfluorinated polymer dispersed within the granules. The polyfluorinated polymer is described as a compaction aid to assist in the compaction of the finely-divided calcium hypochlorite prior to granulation. This granulated product may be formed into solid articles, such as tablets, which are reported to dissolve more slowly in water than tablets prepared from granular calcium hypochlorite which does not contain the described polymer or other compacting aids.

It has now been discovered that slow dissolving solid articles of calcium hypochlorite, such as tablets, may be prepared by forming such articles from granular calcium hypochlorite, only the surface of which has been treated with polyfluorinated polymer. It has been discovered also that often lower levels of polyfluorinated polymer can be used to achieve tablet dissolution rates comparable to those achieved by the method described in U.S. Pat. No. 4,865,760.

A further benefit obtained is the improved control of polyfluorinated polymer dosage on the calcium hypochlorite product, which results in less variability in the level of polymer treatment and a more homogeneously treated product. This benefit results from the polyfluorinated polymer treatment being a separate step rather than as part of the calcium hypochlorite production process, as described in U.S. Pat. No. 4,865,760. In that process, as the rate of calcium hypochlorite production fluctuates, the polyfluorinated polymer addition rate must change accordingly to maintain the same dosage level, which presents a difficult process control problem. Further, upsets in the polymer addition system or calcium hypochlorite production process, as practiced in the process of U.S. Pat. No. 4,865,760, affects a larger volume of product than when the treatment is practiced as a separate step.

BRIEF DESCRIPTION OF THE DRAWING

The specific features of the present invention will become more clear from the following detailed description made with reference to the drawing, which is a schematic flow diagram of the process steps of a method for preparing polyfluorinated polymer-treated granular calcium hypochlorite.

DETAILED DESCRIPTION OF THE INVENTION

Granular calcium hypochlorite is a commercially available material. It is prepared by a variety of processes from the raw materials: lime, alkali, e.g., sodium hydroxide, and chlorine. See, for example, U.S. Pat. Nos. 3,950,499, 3,954,948, 4,328,200 and 4,390,512. Commercially available calcium hypochlorite may vary slightly in its composition depending on the commercial source and the process used to prepare the product. Typically, commercially available granular calcium hypochlorite contains at least about 60 weight percent available chlorine (as calcium hypochlorite), e.g., between about 60 and 73 weight percent available chlorine, more particularly between about 65 and 71 weight percent available chlorine. Moisture (water) may comprise between about 2 and about 15 percent, more particularly between about 4 and about 10 weight percent, of the commercial calcium hypochlorite product. The remainder of the calcium hypochlorite article of commerce is typically composed of varying amounts of one or more residual salts, such as sodium chloride, calcium chloride, calcium hydroxide and calcium chlorate. The amount of residual salts in calcium hypochlorite articles of commerce will depend on the process used by each manufacturer to prepare the calcium hypochlorite.

Calcium hypochlorite granules treated in accordance with the present invention generally have a principle size distribution between about −6 and +100 U.S. Sieve Series, i.e., the granules vary in size principally between about 0.132 inches (3.36 millimeters) and about 0.006 inches (0.149 millimeters).

In accordance with the present invention, the surface of granular calcium hypochlorite is treated with from about 0.005 to about 0.5, more typically from 0.05 to 0.35, e.g., 0.08 to 0.1, weight percent of polyfluorinated polymer and the resulting treated granular calcium hypochlorite formed into solid articles, e.g., tablets. The level of treatment can vary depending on the end use application of the solid articles. Such treatment of the granular calcium hypochlorite may be batch or continuous and may be accomplished in any suitable manner that results in a substantially uniform treatment of the surface of the granules with the polyfluorinated polymer. For example, one expeditious method of applying polyfluorinated polymer to the surface of the granules is to spray an aqueous suspensoid (or emulsion) of the polyfluorinated polymer onto a fluidized bed of the granules. Another method is to spray the suspensoid onto a moving agitated bed of the granules, such as a bed of granules being advanced by a screw conveyor or other conveying device, e.g., a belt conveyor. The foregoing mode of treatment produces granules having their interior or inner portion substantially free of polyfluorinated polymer. Whether batch or continuous, the treatment step is practiced separate from the calcium hypochlorite production process. The polyfluorinated polymer treated calcium hypochlorite, particularly material treated with the higher levels of polymer described, e.g., 0.1-0.5 weight percent, can be blended with untreated granular calcium hypochlorite to obtain a product having an average polyfluorinated polymer level within the described treatment range which may also be shaped into the solid articles, as described herein.

When an aqueous suspensoid of polyfluorinated polymer is used, it may be sprayed onto agitated granules of calcium hypochlorite by a spray nozzle using pressurized atomizing air, e.g., at a pressure of from about 10 to 50 pounds per square inch gage (69 to 345 mPa). Spraying of the polyfluorinated polymer in this manner does not appear to result in fibrillation of the polymer into fibrils.

Examples of polyfluorinated polymeric materials that may be used to treat the granular calcium hypochlorite include: polytetrafluoroethylene (PTFE), polychlorotrifluoroethylene, polyhexafluoropropylene, copolymers of chlorotrifluoroethylene and ethylene, copolymers of ethylene and tetrafluoroethylene, copolymers of hexafluoropropylene and tetrafluoroethylene, copolymers of vinylidene fluoride with tetrafluoroethylene, hexafluoropropylene, chlorotrifluoroethylene or pentafluoropropylene, and terpolymers of vinylidene fluoride, hexafluoropropylene and tetrafluoroethylene. Also contemplated are fluoroalkyl acrylates, such as poly(1,1-dihydroperfluorobutyl acrylate), poly(3-perfluoromethoxy-1,1-dihydroperfluoropropyl acrylate), poly(trifluoroisopropyl methacrylate) and the condensation product of adipic acid and 2,2,3,3,4,4-hexafluoropentanediol. Polytetrafluoroethylene (PTFE) is preferred.

The polyfluorinated polymer used to treat the granular calcium hypochlorite is advantageously used in the form of an aqueous suspension. Aqueous suspensions containing from about 30 to about 70 weight percent solids are contemplated, but other concentrations may also be used.

A variety of commercially available forms of PTFE may be used to prepare the granular calcium hypochlorite product(s) of the present invention. Among such forms is TEFLON ® K Type 20 fluorocarbon polymer. TEFLON ® K Type 20 fluorocarbon polymer is an aqueous suspensoid (emulsion) of fluorocarbon particles which range in size from about 0.05 to about 0.5 microns. TEFLON ® K Type 20 is offered for sale by the E.I. duPont de Nemours & Company. TEFLON ® K Type 20 typically contains about 33 percent by weight solids and the suspension is stabilized with approximately 1 percent by weight of a nonionic surfactant. Other aqueous suspensions of fluorocarbon polymer, e.g., those containing from about 30 to about 70 weight percent solids, may also be used. The higher solids content suspensions will contain higher amounts of surfactant for stabilization. An aqueous suspension of the fluorocarbon polymer, e.g., PTFE, is preferred for convenience of mixing.

Referring now to the accompanying drawing, there is described a schematic flow diagram of a process embodiment of the present invention. In accordance with that embodiment, granular calcium hypochlorite and any other additives, such as colorant treated sodium chloride salt, as described in International Patent Publication WO 90/00006, or other conventional additives, are introduced into blender 1 from a source not shown. Polyfluorinated polymer, e.g. PTFE, suspension from a source not shown is introduced into feed tank 2. Optionally, a heating band (not shown) or insulation may be attached to the outside of feed tank 2 to maintain the aqueous polymer suspension fluid when the ambient temperature is below freezing. Feed tank 2 is pressurized by air from a source not shown through air flow line 3 controlled by valves V, and the PTFE suspension permitted to flow through flow line 4 to spray nozzle 6. Pressurized air for atomizing the PTFE suspension is forced through air flow line 5 controlled by a valve V at a pressure of 10-50 psig (69 to 345 mPa). The PTFE suspension passing through flow line 4 is atomized at spray nozzle 6 while the granules of calcium hypochlorite are agitated in the blender 1. After all of the required amount of polymer suspension has been charged to the blender and thoroughly mixed with the granules, the resultant blended product (granular calcium hypochlorite treated with PTFE) is conveyed to tableting device 7 by means of product flow line 8 where the treated granules are formed into tablets.

Granular calcium hypochlorite is typically sufficiently free-flowing to allow it to be introduced into conventional size enlarging compaction devices wherein it is compacted with pressure into the shape desired, e.g., a tablet. Size-enlarging devices that may be used to prepare calcium hypochlorite articles include a molding press, tableting press, roll-type press, pellet mill and screw extruder. These devices are known in the art. The compressed article may be prepared in any convenient desired shape or size, e.g., a brick, briquette, triangle, doughnut, star, pellet, tablet, etc., depending upon the intended use of the article or product differentiation desired by the manufacturer. Preferably, the shape is that of a tablet. The compressed article may typically have a mass of between about 1 gram and about 350 grams or more, e.g., between about 7 and 300 grams. The compressed article may be of a size which may be inserted readily into a skimmer or dissolving basket used with swimming pools or dissolvers used to form concentrated solutions of calcium hypochlorite. In the case of a 300 gram tablet, it is preferred that the diameter of such tablet be between about 3 inches (7.6 centimeters) and about 3.5 inches (8.9 centimeters), e.g., between about 3.125 and 3.25 inches (7.9 and 8.3 centimeters), and be about 1 to 2 inches (2.5–5.1 centimeters), e.g., 1.25 inches (3.2 centimeters) thick.

Solid articles, such as tablets, of compressed granular calcium hypochlorite prepared with the polyfluorinated polymer treated granular calcium hypochlorite described hereinabove dissolve more slowly than tablets prepared from calcium hypochlorite that does not contain a polyfluorinated polymer additive when such tablets are placed in a skimmer basket used in association with swimming pools and contacted with circulating pool water. The slow dissolution of the aforesaid article thereby provides a source of available chlorine for disinfecting and sanitizing pool water over the period of time required to dissolve substantially all of the calcium hypochlorite tablet. Such tablets may also be used in flow-thru tablet feeders where their slower dissolving rate reduces the frequency that the feeder needs to be recharged.

The present invention is more particularly described in the following examples which are intended as illustrative only since numerous modifications and variations therein will be apparent to those skilled in the art.

EXAMPLE 1

A Patterson Kelley 8 inch (20.3 cm) blender (zig-zag continuous unit) was charged with granular calcium hypochlorite having a principal particle size of −10 to +30 U.S. Sieve Series at a rate of 1375.0 pounds/hour (623.7 kg/hr). The calcium hypochlorite contained about 71 percent available chlorine and a moisture content of about 5–7 weight percent. TEFLON® K Type 20 polytetrafluoroethylene (PTFE) emulsion was charged to a feed tank. The PTFE was an aqueous (latex) suspension containing 33 percent solids. An air atomizing spray nozzle was positioned at the feed end of and within the blender, and connected to the feed tank with an appropriate feed line. The feed tank was pressurized to deliver a flow of PTFE dispersion to the blender at a rate of 12.8 pounds/hour (5.8 kg/hr) under a pressure of 10 psig (69 mPa). The atomizing air pressure in the feed line was 15 psig (103 mPa).

The PTFE-treated granular calcium hypochlorite was analyzed for polytetrafluoroethylene and found to contain about 3,500 ppm (parts per million) polytetrafluoroethylene. The analysis was performed by dissolving the product in water, decomposing the calcium hypochlorite with hydrogen peroxide, acidifying the sample with hydrochloric acid to dissolve acid-soluble material therein, heating the sample to boiling to coagulate the polytetrafluoroethylene, and filtering through a backwashed coarse sintered glass filtering funnel to separate the polytetrafluoroethylene.

This PTFE-treated material was used to produce 3.125 inch (7.9 cm) diameter tablets of 300 gram weight by using a Stokes 294 mechanical press. The tablet had an average density of 2.02 grams per cubic centimer (g/cc). The aqueous dissolution rate of the tablets produced was measured by placing a tablet in the skimmer basket of an above ground pool and flowing water at a temperature of 80° F. (26.7° C.) at a constant flow rate of 35±5 gallons per minute (0.0022 m³/sec) over the tablet for 2 hours. The weight percent remaining of the tablet after the 2 hour test was calculated to be 91.8 percent.

EXAMPLE 2

Granular calcium hypochlorite of the type described in Example 1 treated with 400 ppm PTFE was prepared in the manner described in Example 1. The blender was charged with 1375.0 pounds per hour (623.7 kg/hr) of granular calcium hypochlorite and the feed tank charged with TEFLON® K Type 20 suspension which suspension was charged to the blender at a rate of 4.1 pounds per hour (1.9 kg/hour). At one point during this process the liquid TEFLON® PTFE suspension stopped flowing. The PTFE-treated granular calcium hypochlorite was analyzed for polytetrafluoroethylene by the method described in Example 1 and found to contain about 400 ppm polytetrafluoroethylene. The 300 gram tablets prepared with this material had an average density of 1.99 g/cc and were tested in the manner described in Example 1. The weight percent of the tablet remaining after the 2 hour dissolution test was 77.2 percent.

EXAMPLE 3 (Comparative)

Granular calcium hypochlorite containing no PTFE was prepared in the manner described in Example 1, except that a Paterson 40 cubic foot double cone blender was used in a batch (rather than continuous) mode of operation. The blender was charged with 4 drums [about 1600.0 pounds (725.7 kg)] of granular calcium hypochlorite of the type described in Example 1 and 48 pounds (21.8 kg) of granular sodium chloride salt colored with a blue dye, as described in International Patent Publication WO90/00006. The feed tank was charged with water. The 300 gram tablets prepared with this material had an average density of 1.90 g/cc and were tested in the manner described in Example 1. The weight percent of the tablet remaining after the 2 hour dissolution test was 58.4 percent.

EXAMPLE 4 (Comparative)

Granular calcium hypochlorite containing about 1539 and 3870 ppm PTFE was prepared in the manner described in U.S. Pat. No. 4,865,760. The 300 gram tablets prepared with this material had average densities of 1.956 and 1.953 g/cc respectively and were tested in the manner described in Example 1. The weight percents of the tablets remaining after the 2 hour dissolution test were 59.8 and 88.3 percent respectively.

EXAMPLE 5

A series of comparative experiments were performed in which granular calcium hypochlorite containing about 3000 ppm PTFE was prepared by (i) the method described in U.S. Pat. No. 4,865,760 and (ii) by the method described in this application. The 300 gram tablets prepared from the granular calcium hypochlorite produced by both methods were tested in the manner described in Example 1. The weight percent of the tablets remaining (after the 2 hour dissolution test) were averaged monthly from daily production lots of 19 to 33 per month. For tablets prepared using granular calcium hypochlorite produced by the method of U.S. Pat. No. 4,865,760, the weight percent average ranged from 88.2 to 91.6 percent. For tablets prepared using granular calcium hypochlorite produced by the method described in this application, the weight percent average was 93.9 percent.

The data of the above Examples shows that the method described in the present application enables the preparation of calcium hypochlorite tablets which provide the same result, i.e., weight percent of tablet remaining after the 2 hour dissolution test, using less polytetrafluoroethylene. Stated alternatively, the method described in the present application enables the preparation of calcium hypochlorite tablets which provide a generally higher percentage of tablet remaining after the 2 hour dissolution test than tablets prepared from granular calcium hypochlorite prepared using the method of U.S. Pat. No. 4,865,760 where the amount of polytetrafluoroethylene is about the same.

Although the present process has been described with reference to specific details of certain embodiments thereof, it is not intended that such details should be regarded as limitations upon the scope of the invention except as and to the extent that they are included in the accompanying claims.

We claim:

1. A method for preparing calcium hypochlorite articles for use in slow dissolving applications, comprising treating the surface of granular calcium hypochlorite having a principal particle size range of between −6 and +100 U.S. Sieve Series with from about 0.005 to about 0.5 weight percent of an agent consisting essentially of polyfluorinated polymer, and forming said treated granular hypochlorite into a shaped article having a mass of between about 1 gram and about 350 grams.

2. The method of claim 1 wherein the polyfluorinated polymer is a polytetrafluoroethylene.

3. The method of claim 2 wherein the polyfluorinated polymer is unfibrillated.

4. The method of claim 2 wherein the shaped article is in the form of a tablet.

5. The method of claim 2 wherein the surface of the granular calcium is treated with from about 0.05 to about 0.35 weight percent of polytetrafluoroethylene.

6. The method of claim 5 wherein the polytetrafluoroethylene is unfibrillated.

7. The method of claim 6 wherein the shaped article is in the form of a tablet having a mass of between about 7 grams and 300 grams.

8. The method of claim 1 wherein the granular calcium hypochlorite is treated by spraying an aqueous suspension of the polyfluorinated polymer onto a bed of agitated calcium hypochlorite granules.

9. The method of claim 8 wherein the polyfluorinated polymer is polytetrafluoroethylene.

10. Granular calcium hypochlorite having a principal particle size range between −6 and +100 U.S. Sieve Series having from about 0.005 to about 0.5 weight percent of an agent consisting essentially of polyfluorinated polymer applied to the surface of the granules, the interior of said granules being substantially free of said polyfluorinated polymer.

11. Granular calcium hypochlorite according to claim 10 wherein the polyfluorinated polymer is polytetrafluoroethylene.

12. Granular calcium hypochlorite according to claim 11 wherein from 0.05 to 0.35 weight percent of polyfluorinated polymer is applied to the surface of the granules.

13. Granular calcium hypochlorite according to claim 11 wherein the polyfluorinated polymer is unfibrillated.

14. A solid calcium hypochlorite article prepared from the calcium hypochlorite granules of claim 10, said article having a mass of between about 1 gram and about 350 grams.

15. The solid calcium hypochlorite article of claim 14 which is in the form of a tablet having a mass of between about 7 and about 300 grams.

* * * * *